United States Patent [19]
McCarton et al.

[11] 4,258,695
[45] Mar. 31, 1981

[54] STORED HEAT COOKING UTENSIL

[75] Inventors: D. John McCarton, Everett, Wash.; Vrle T. Minto, P.O. Box 486, Altaville, Calif. 95221

[73] Assignee: Vrle T. Minto, Altaville, Calif.

[21] Appl. No.: 858,782

[22] Filed: Dec. 8, 1977

[51] Int. Cl.³ .............................................. F24H 7/00
[52] U.S. Cl. .................................. 126/375; 126/246; 126/390; 126/400; 220/412
[58] Field of Search ............... 126/390, 375, 385, 357, 126/246, 400, 348, 369.2, 373, 377, 376, 369; 99/70, 408, 412; 220/412, 408

[56] References Cited
U.S. PATENT DOCUMENTS

| | | | |
|---|---|---|---|
| 304,997 | 9/1884 | Elson | 126/246 |
| 1,034,268 | 7/1912 | McCord | 126/400 |
| 1,103,159 | 7/1914 | Roscoe | 220/412 |
| 1,157,991 | 10/1915 | Linton | 126/390 |
| 1,698,914 | 1/1929 | Kircher | 126/377 |
| 2,088,319 | 7/1937 | Comstock | 126/377 |
| 2,419,416 | 4/1947 | Mustain | 126/246 |
| 2,462,362 | 2/1949 | Christensen | 126/377 |
| 2,515,709 | 7/1950 | Heard et al. | 220/412 X |
| 2,517,320 | 8/1950 | Johnston | 126/390 |
| 2,640,478 | 6/1953 | Flournoy | 126/375 |
| 2,841,137 | 7/1958 | Chace | 126/390 |
| 3,065,744 | 11/1962 | Scavullo | 126/246 |
| 3,557,774 | 1/1971 | Kreis | 126/246 |
| 3,734,077 | 5/1973 | Murdough et al. | 126/375 X |
| 3,745,290 | 7/1973 | Harnden, Jr. et al. | 220/408 X |
| 3,916,872 | 11/1975 | Kreis et al. | 126/375 |
| 4,086,907 | 5/1978 | Rothschild | 126/375 X |

FOREIGN PATENT DOCUMENTS 629654 10/1961 Canada .................................. 126/375

OTHER PUBLICATIONS

Prals Enterprises, "Reording Parts List", Jul. 1976.

Primary Examiner—Samuel Scott
Assistant Examiner—Randall L. Green
Attorney, Agent, or Firm—David H. Deits; Roy E. Mattern, Jr.; Kenneth S. Kessler

[57] ABSTRACT

A stored heat cooking utensil is provided which consists of an outer container, a cooking vessel, a heat storage element, a lid for enclosing the outer container and cooking vessel, a handle for manipulating the cooking vessel and the heat storage element, and a container handle which serves as a carrying handle for the cooking utensil and a lid securing device. The outer container consists of an insulated container having a tapered interior metal lining with an upwardly directed projection in the bottom. Projecting ears are provided on opposite sides of the container for attachment of the container handle in the form of a rope. The heat storage element is a disk of soapstone having a metal band around its exterior perimeter having its side perpendicular to the stone's top and bottom. The cooking vessel is a metal container having tapered sides. It has a pair of slots in its walls. A projecting rib extends around the perimeter of the vessel bottom. The upper rim has a projecting rolled edge. The lid with a handle is insulated and has a tapered projecting central portion on its bottom surface. A groove on the under side of the lid receives the upper edge of the liner of the outer container. The combined heat storage element and cooking vessel lifting handle is in the form of an elongated rod with a central loop and a projection on one end.

1 Claim, 8 Drawing Figures

STORED HEAT COOKING UTENSIL

BACKGROUND OF THE INVENTION

1. Field of the Invention

The invention relates to stored heat cooking utensils of the type in which a heated storage element such as a stone is positioned beneath a cooking vessel and the heat transferred from the vessel is used to maintain the food in the vessel at an elevated temperature or to cook the food.

2. Prior Art

Stored heat cooking vessels have been used for many years. They have been found to be particularly beneficial where a heating element such as a stone can be heated in a stove or on the campfire and the stored heat energy used to maintain foods at an elevated temperature or to slowly cook the food. U.S. Pat. No. 2,640,478, A. F. Flournoy, illustrates such a device. This consists of an outer container which has a heat storing element in its interior base and supports above it a cooking vessel having an enclosing lid. The vessel appears much like a double-boiler cooking pan with the heat element in the position of the water. U.S. Pat. No. 2,419,416 illustrates a holder and warmer for liquid containers using the same principles involved in the cooking vessel.

SUMMARY OF THE INVENTION

A stored heat cooking utensil is provided which consists of an outer container, a cooking vessel, a heat storage element, a lid for enclosing the outer container and cooking vessel, a handle for manipulating the cooking vessel and the heat storage element, and a container handle which serves as a carrying handle for the cooking utensil and a lid securing device. The outer container in its preferred form consists of an insulated container having an interior metal liner having tapered walls. The metal linear has a substantially planar bottom with the exception of an upwardly directed projection for supporting the heat storage element. The top of the liner is provided with a rolled rim. An insulating ceramic batting is placed adjacent the exterior surface of this liner. An outer polyethylene covering is provided for the outer container and polyurethane foam fills the space between the outer covering and the interior components. Projecting ears are provided on opposite sides of the container for attachment of the container handle described below. The heat storage element consists in its preferred form of a disk of soapstone having a metal band around its exterior perimeter. A lifting eye is secured to the center of the stone. The side of the disk is preferably perpendicular to its top and bottom. The cooking vessel in its preferred form is a metal container having tapered sides which taper corresponds to the taper of the outer container's liner. A projecting rib extends downward around the perimeter of the bottom to support the cooking vessel above the top surface of the heat storage element and form a groove on the vessel's interior. The upper rim of the cooking vessel is provided with an outwardly projecting rolled edge to help maintain the cooking vessel on a space relation from the walls of the liner of the outer container. The cooking vessel also has slots on opposite sides of its upper wall surfaces. The lid has an insulated upper portion with a handle having extended upper ends and has a projecting central portion on its bottom surface. The edges of this central projection are tapered to correspond to that of the walls of the cooking vessel which engage this tapered portion. The projection serves to maintain the cooking vessel within the central portion of the outer container. A groove is provided on the under side of the lid to meet with the upper edge of the liner of the outer container. This acts to seal the outer container against unwanted escape of heat. The combined heat storage element and cooking vessel lifting handle is provided preferably in the form of an elongated rod having a central loop which permits the ends to be temporarily displaced inwardly so that they may be inserted in the slots in the cooking vessel walls. One end preferably has a projection for engaging the lifting eye attached to the stone. A rope handle having loops on either end which fit over the ears provided on the outer container has mounted on it a tubular grip positioned centrally by knots. This center portion of this rope is twisted about the lid handle to secure the lid in place during cooking. The rope handle is unlooped from the lid handle for use in carrying the utensil.

DETAILED DESCRIPTION

Figure 8:
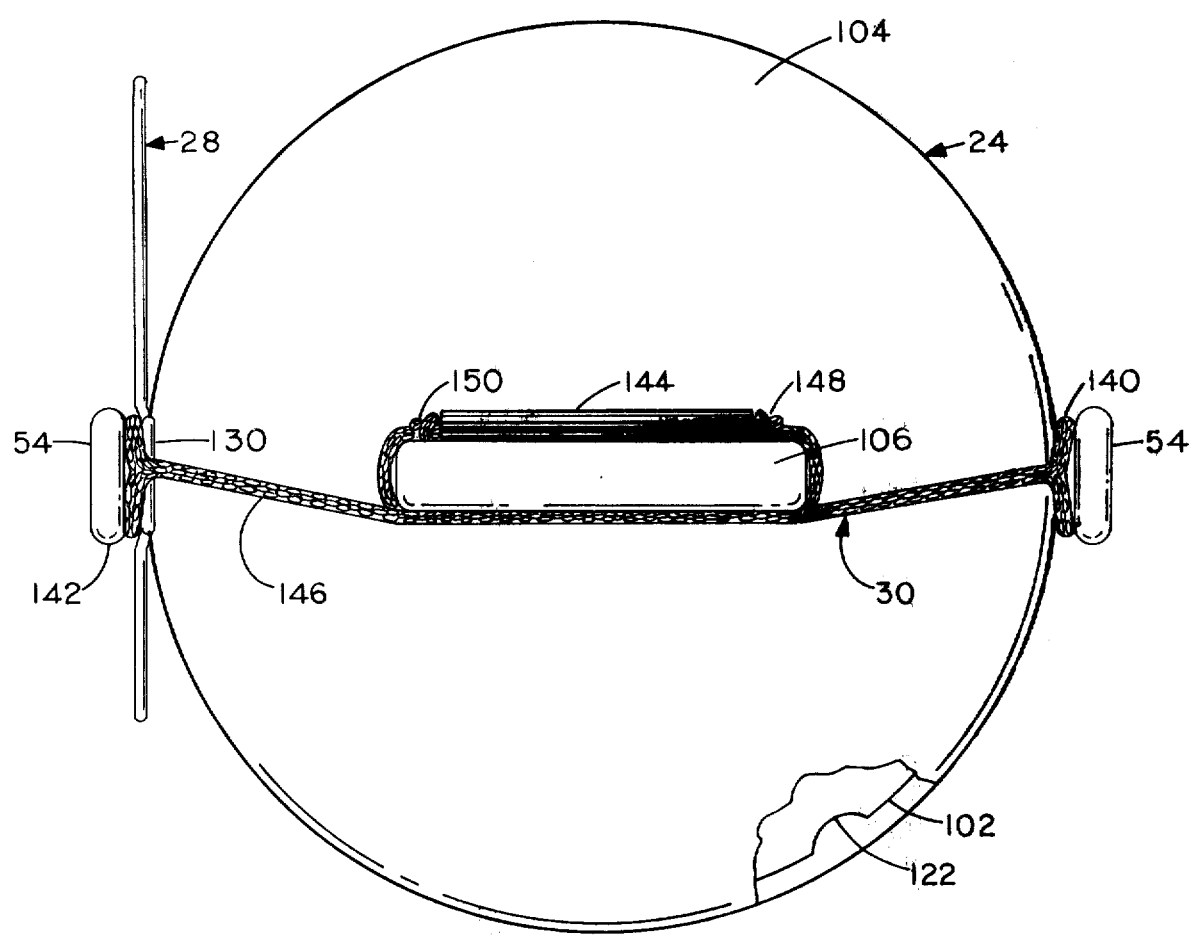
FIG. 8 is a plan view of the stored heat cooking utensil with the lid in place secured by the rope handle with the combined heat storage element and cooking vessel lifting handle in its stored position and with a broken away section illustrating part of the lid construction.

The invention relates to a stored heat cooking utensil 18 illustrated in its preferred form in FIGS. 1 through 8. It consists of an insulated outer container 20 which has an opening in its top and receives and supports on its interior bottom a heat storage element 26. A cooking vessel 22 also having an open top, fits within the outer container 20 and is supported by and rests upon the heat storage element 26. An insulated lid 24 closes both the cooking vessel 22 and the outer container 20. A flexible rope or cord handle 30 attached to the outer container 20 serves as a means for carrying the stored heat cooking utensil and also for securing the lid in position as illustrated in FIG. 8. A combined heat storage element and cooking vessel lifting handle 28 is provided and illustrated in FIG. 4.

Figure 6:
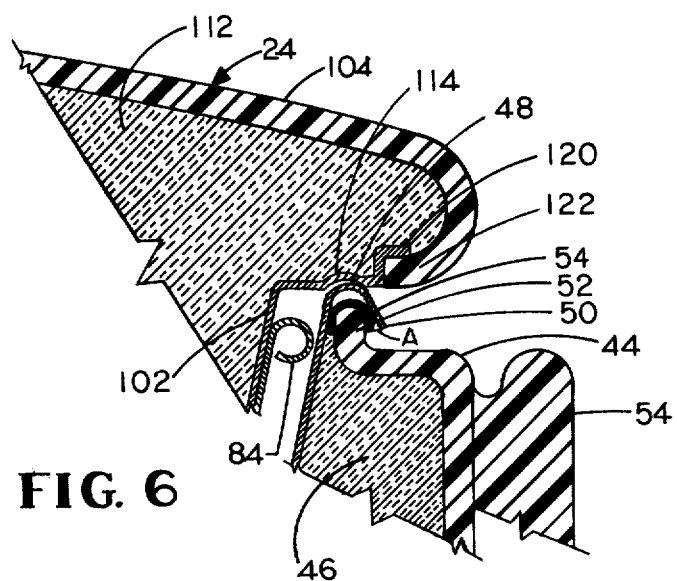
FIG. 6 is a detailed section of a portion of the stored heat cooking utensil noted in FIG. 3.
Figure 7:
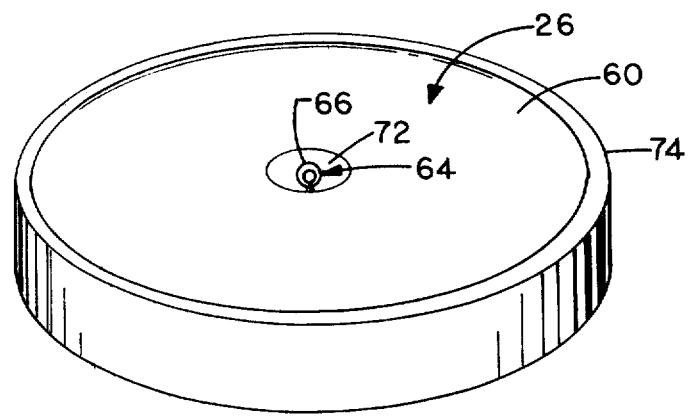
FIG. 7 is a perspective view of the preferred heat storage element.

The outer container 20 has an interior metal liner 32. Preferably this is of aluminum alloy 1100. The metal liner preferably has a tapered side wall 34. An approximately 5 degree taper is preferred. The bottom 36 of the liner is preferably planar with the exception of an upwardly directed projection or projections preferably in the form of a circular ridge 38 which supports the heat storage element 26. This serves to keep the heat storage element off the bottom in order to reduce heat transfer to the liner. In this manner heat loss through the outer container is reduced and damage to the exterior components of the outer container which are described below is avoided. Three individual projections or other discontinuities in the bottom 36 may serve in place of the circular ridge 38. A locking ridge 40 in the form of a discontinuity in the liner extends around the circumference of the liner wall 34. A first insulating layer is placed on the bottom of the liner and around all but the top of the side wall of the liner. A preferred form of insulation material is a flexible ceramic fiber batting 42 composed principally of alumina and silica. Such a material is made by the Carborundum Company, P.O. Box 808, Niagra Falls, N.Y. 14302, and distributed under the trademark Fiberfrax. A ¼" to ⅜" thich batting is recommended. During construction an adhesive may be used to hold the flexible ceramic fiber batting 42 in position until construction is complete. It is not necessary that this be a high temperature adhesive since on completion of construction the batting will be held securely in place by the other components. This serves as the principal form of insulation. The exterior surface of the outer container is covered with an insulating covering 44 of approximately ⅛" thick polyethylene. A preferred construction is to use a polyethylene formed by rotary molding. The space between the outer covering 44 and the interior components is filled with an insulating foam 46, preferably a high temperature polyurethane foam which is foamed in place. The locking ring engages the foam 46 to secure the liner 32 to the balance of the structure of the outer container 20. This locking ring should be sufficiently below low enough on the liner wall 34 so that it does not interfere with the operation of the handle 28 described below. Referring to FIG. 6, where the upper portion of the liner is shown in detail, the upper edge of the liner about the opening is formed into a rolled, projecting rim 48, which has an exterior edge 50, which in the preferred construction extends over the exterior insulation 44 at its upper edge 52. Rather than having this edge 50 fold tightly over the upper edge 52 of the exterior covering 44, this edge should extend outwardly at a projecting angle A of 40 to 45 degrees from vertical. This serves to dissapate heat and prevent melting of the polyethylene outer covering 44 which is less heat resistant than the other insulating materials. Preferably a U-shaped strip in the form of a high temperature nylon band 54 is placed over the upper edge 52 of the exterior covering 44 and underneath the projecting rim 48. Ears 54 are provided on the exterior of the outer container 20 for connection of the handle 30.

The heat storage element may take many forms but in its preferred form it consists of a disk of quarried soap stone. The disk has a substantially planar top surface 60 and a parallel and substantially planar bottom surface 62. Preferably a lifting provision is supplied such as the illustrated pin 64 having an eye 66 located on the top surface of the disk and extending through the stone and having bent ends 68 and 70 which secure it to the stone. A depression 72 is provided in the upper surface in which the eye 66 rests. The soap stone is preferably a grade harder than carving grade stone because if the stone is too hard it won't retain the heat well. Preferably the disk has a metal circumferential band in the form of a channel 74 which serves to hold the stone together if it cracks, which it will do in use particularly if the stone has a high level of impurities. Preferably the side of the disk 76 is normal to the top and bottom surface of the stone 60 and 62 respectively. This will reduce the area of contact between the stone and the outer container 20, since the wall 76 of the stone and the wall 34 of the outer container liner 32 will be divergent.

The cooking vessel 22 is preferably constructed of a heat conductive material metal such as aluminum alloy 1100. The cooking vessel 80 is tapered at its top and preferably for the full wall height. Preferably the taper is the same as that of the wall 34 of the outer container so that a substantially uniform air space 82 is formed between the adjacent walls of the cooking vessel and the outer container. The cooking container 22 is sized so that it can fit within the outer container 20 without wall contact between the cooking vessel and the outer container. Preferably the cooking vessel 22 is supplied with an outwardly projecting rim 84 about its top opening which serves to maintain the cooking vessel centrally within the outer container to promote uniform heating. In its preferred form as shown in the drawings, the cooking vessel 22 has a downward projecting rib 86 which extends around the outer perimeter of the bottom 88 of the cooking vessel, raising the central interior portion of the bottom 90 above the heat storage element 26 and forming a groove 92 on the perimeter of the bottom of the interior of the cooking vessel. This prevents full contact of the bottom of the cooking vessel with the top surface 60 of the heat storage element 26 to prevent overheating of the food in the cooking vessel. This further avoids heat concentration in the central portion 90 of the cooking vessel bottom. The groove 92 thus formed provides a collecting area at this high heat transfer area for fluids which can be placed in the cooking vessel to prevent overheating of the food being cooked while minimizing the necessary fluid to do so. A pair of slots 94 and 96 are provided in the wall 80 of the cooking vessel 22 for receiving the ends of the handle 28 described below.

Figure 1:
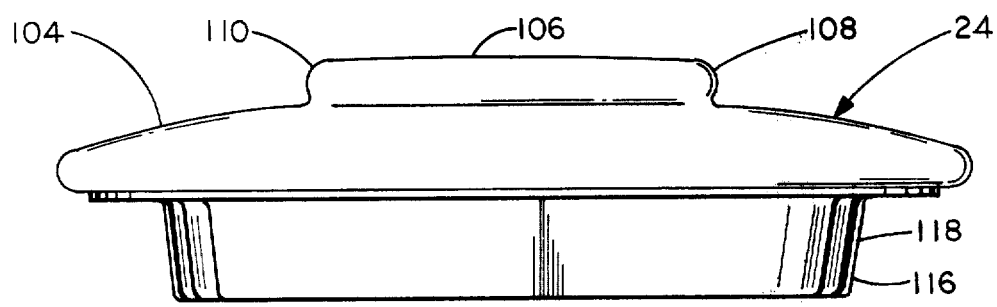
FIG. 1 is a side elevation view of the lid for the stored heat cooking utensil.
Figure 2:
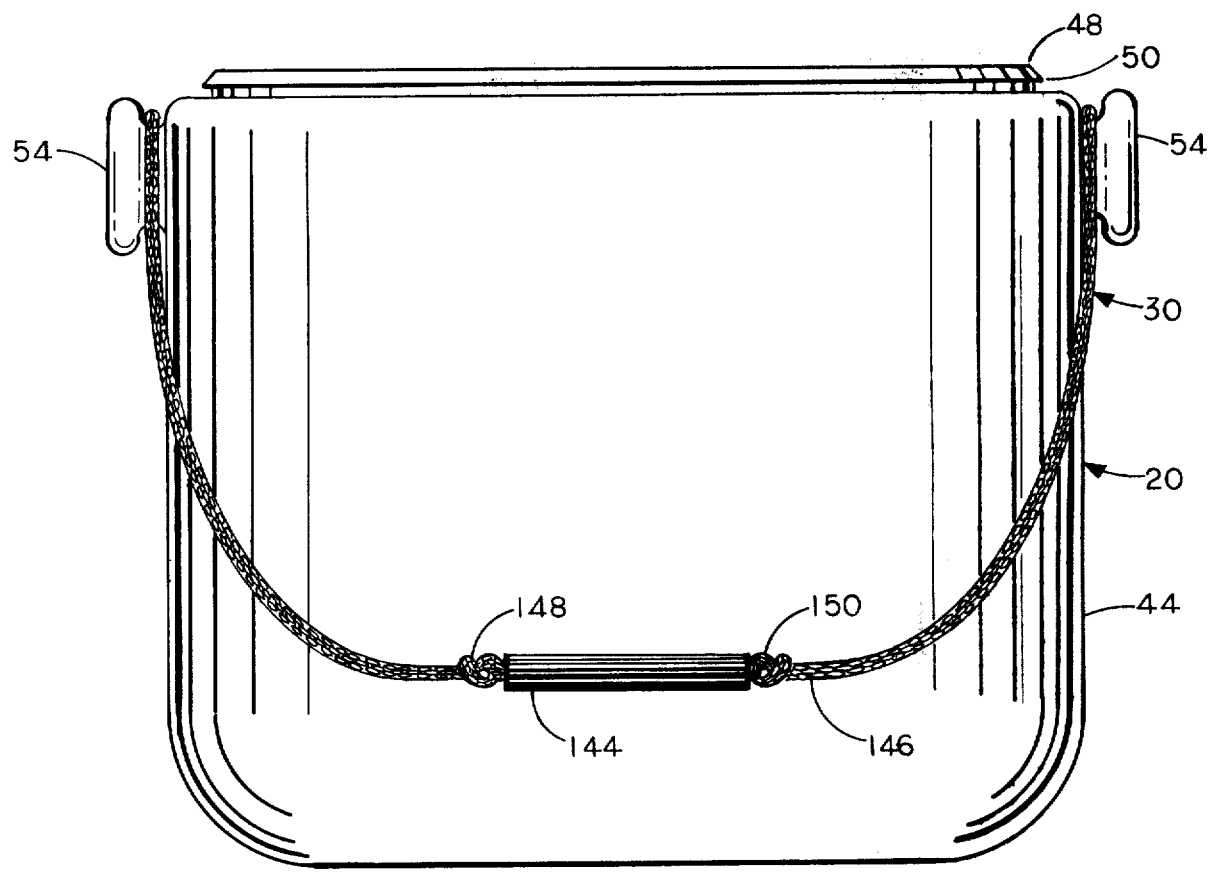
FIG. 2 is a side elevation view of the insulated outer container illustrating also the carrying handle.
Figure 3:
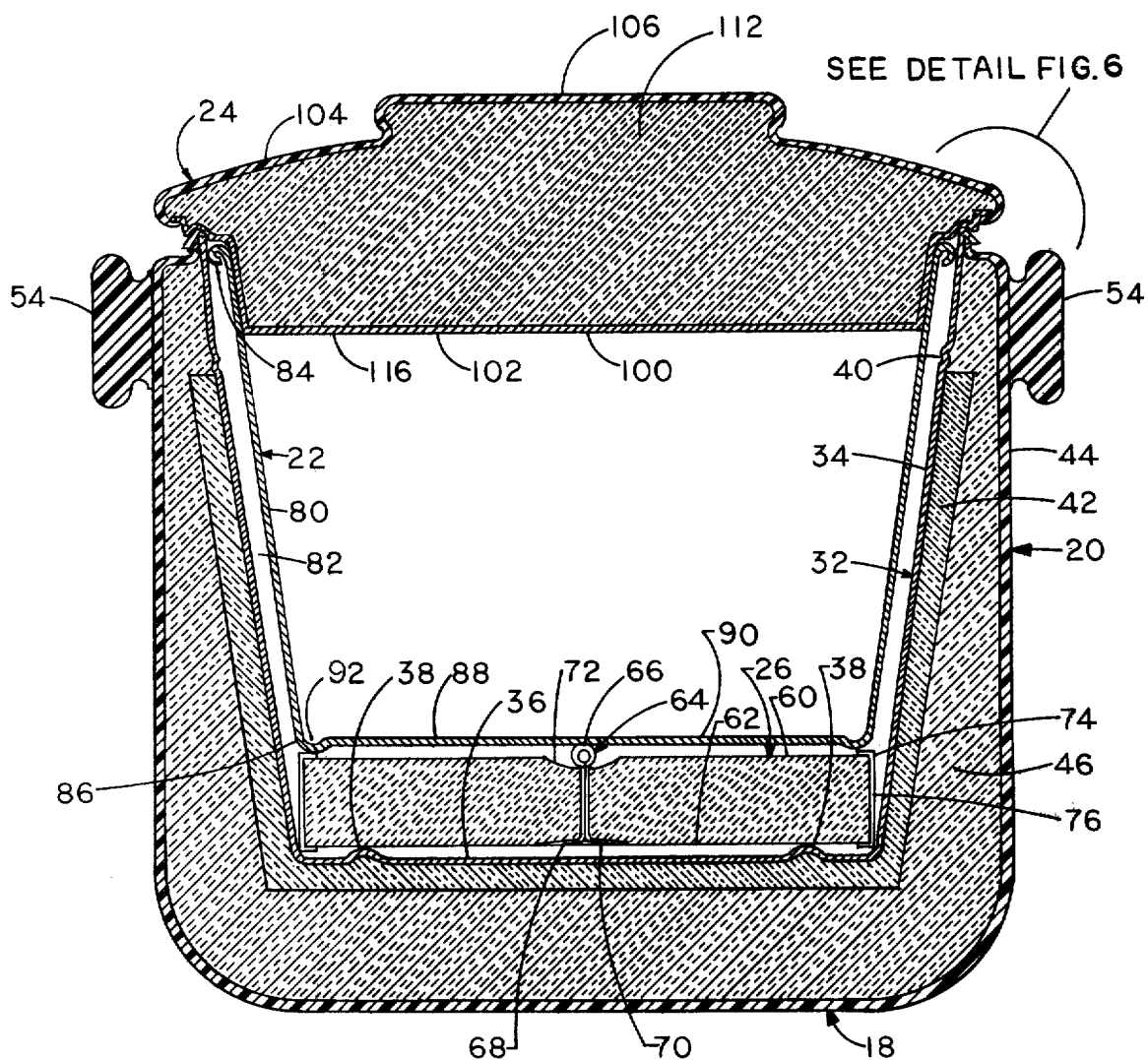
FIG. 3 is a sectional elevation view of the stored heat cooking utensil.

The lid illustrated in FIGS. 1, 3 and 6, in its preferred form, has a bottom surface designated generally by the numeral 100. Its shape is defined by a metal liner 102. The lid like the outer container 20 also has an insulating covering material 104 like that used on the outer container. The handle 106 is centrally located on the top and has extended ends 108 and 110. The interior between the outer covering 104 and the metal liner 102 is filled with an insulating foam 112 which is like that used in the outer container. The lid has an outer container contacting portion in the form of a groove 114 which receivably engages the rolled upper edge 48 of the metal liner 32 of the outer container 20. This serves to seal the outer container and prevent loss of heat. This contruction will permit the lid to be raised by excess pressure within the cooking utensil caused by overheating. The excess pressure will cause the lid to open under these circumstances and allow heat to escape. The under surface of the lid also has a cooking vessel contacting portion in the form of a projection 116 having tapered sides 118. The sides are tapered similarly to those of the cooking vessel 22 in order to closely fit within the open top of the cooking vessel. This projection serves to seal the cooking vessel and prevent this escape of heat and vapor as well as maintain the cooking vessel centrally within the outer container. If the cooking vessel is not held centrally within the outer container hot spots occur due to non-uniform heating of the cooking vessel. The metal liner 102 on the bottom side of the lid 100 has an exterior groove 120 which receives and retains the edge 122 of the outer covering 104. A notch 122 is provided in the edge of the metal liner 102 to assist during assembly of the lid during construction.

Figure 4:
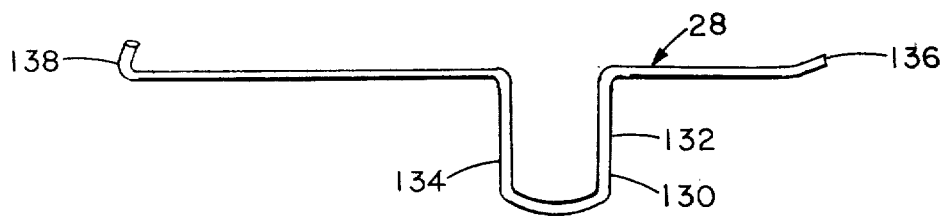
FIG. 4 is an illustration of the combined heat storage element and cooking vessel lifting handle.
Figure 5:
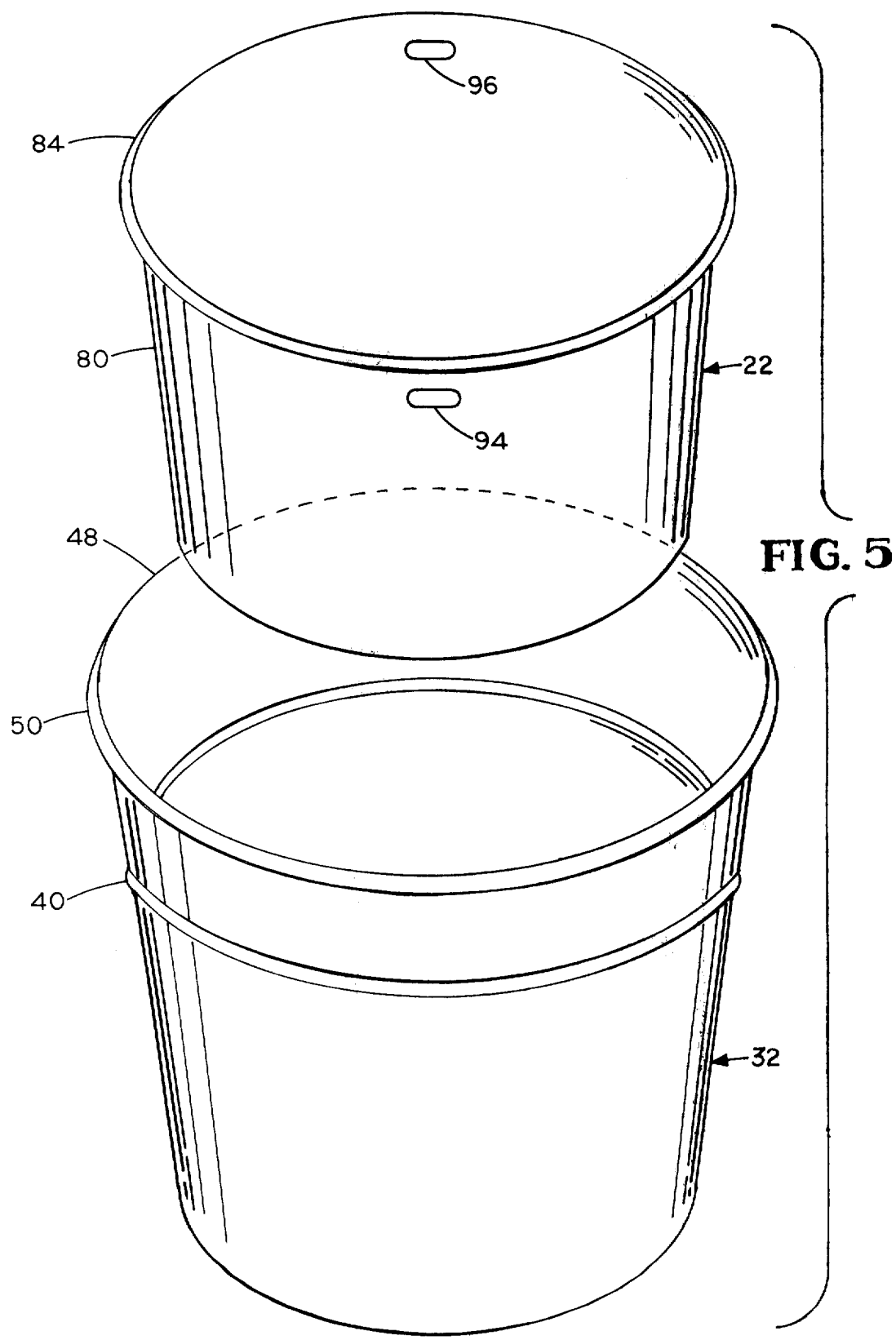
FIG. 5 is a perspective view of the cooking vessel and liner for the outer container with the two parts partially separated.

The combined heat storage element and cooking vessel lifting handle 28 is best illustrated in FIG. 4. It preferably consists of an elongated member, such as a stainless steel rod having a centrally located loop 130. This centrally located loop provides a convenient point for grasping the handle and by squeezing members 132 and 134 the ends of the handle 136 and 138 can be displaced inwardly. The centrally located loop allows the handle to be stored as shown in FIG. 8 by insertion of the loop over one of the ears 54 of the outer container. With the overall length of the handles sized to be greater than the diameter of the upper portion of the cooking vessel 22 by inward displacement of the ends they can be inserted within the slots 94 and 96 of the cooking vessel shown in FIG. 5. This permits the cooking vessel to be lifted from its normal position shown in FIG. 3 within outer container 20. Preferably the ends 38 and 26 are bent slightly to facilitate their insertion and removal from the slots. Further, one end is preferably bent slightly more than 90 degrees to form a hook-like projection as shown in FIG. 4 which may be inserted in the eye 66 in order to lift the heat storage element 26.

The rope handle 30 has loops 140 and 142 at either end which are secured over the ears 54, preferably polyethylene rope is used. A tube 144, preferably of rigid plastic, with the rope 146 passing through it is centrally positioned by knots 148 and 150 on the rope. The handle can be used to carry the cooking utensil 18. When the rope is twisted about the handle 106 of the lid 24, as illustrated in FIG. 8, and held in position due to its length by projections 110 and 108 on the lid handle, the lid 24 is held in place. It may be conveniently used in this fashion to secure the lid when the cooking vessel is being transported, such as in a boat or automobile.

In order to use the stored heat cooking utensil 18, the heat storage element 26 is heated in any one of several manners. It may be heated on high heat on a kitchen range burner or heating element for approximately 30 minutes on high heat or it may be heated in a camp fire for approximately an hour. The heated element is then placed within the outer cooking container and the food to be cooked is placed in the cooking vessel which is then placed on the stored heating element within the outer container and the lid placed in position. The utensil will now slowly cook the food for a period of up to 12 hours. The device, being portable can be taken on boats, in automobiles or carried to places distant from more conventional heat sources while the food continues to remain warm and/or cook.

We claim:
1. Stored heat cooking utensil comprising:
   (a) a heat storage element having a bottom surface and means for lifting it;
   (b) an insulating outer container having an opening in its top and an interior surface with a bottom for supporting the heat storage element;
   (c) a cooking vessel having an opening in its top and receivable within the outer container above the heat storage element and having a surrounding side wall with two openings diametrically opposite one another;
   (d) an insulating lid having an outer container contacting portion which encloses the outer container to prevent the escape of heat; and
   (e) a combined heat storage element and cooking vessel lifting handle including an elongated member having a resilient central loop and two oppositely directed projecting ends on either side of the loop each engagable in the openings in the wall of the cooking vessel from the interior of the vessel and having an end of one of the projecting ends which has an angular projection for engagement in the heat storage element lifting means in order to lift the heat storage element by use of the handle.

* * * * *